(12) United States Patent
Saito

(10) Patent No.: US 9,319,542 B2
(45) Date of Patent: Apr. 19, 2016

(54) IMAGE FORMING APPARATUS, IMAGE FORMING PROCESSING SETTING METHOD, AND RECORDING MEDIUM HAVING RECORDED THEREON COMPUTER PROGRAM FOR THE IMAGE FORMING PROCESSING SETTING METHOD

(75) Inventor: Seiji Saito, Shizuoka-ken (JP)

(73) Assignees: TOSHIBA TEC KABUSHIKI KAISHA, Tokyo (JP); KABUSHIKI KAISHA TOSHIBA, Tokyo (JP)

( * ) Notice: Subject to any disclaimer, the term of this patent is extended or adjusted under 35 U.S.C. 154(b) by 553 days.

(21) Appl. No.: 13/268,128

(22) Filed: Oct. 7, 2011

(65) Prior Publication Data

US 2012/0262747 A1    Oct. 18, 2012

Related U.S. Application Data

(60) Provisional application No. 61/392,707, filed on Oct. 13, 2010, provisional application No. 61/466,654, filed on Mar. 23, 2011.

(51) Int. Cl.
*G06K 15/02* (2006.01)
*H04N 1/00* (2006.01)
(Continued)

(52) U.S. Cl.
CPC ....... *H04N 1/00411* (2013.01); *H04N 1/00448* (2013.01); *H04N 1/00453* (2013.01); *H04N 1/00456* (2013.01); *H04N 1/2338* (2013.01); *H04N 1/00204* (2013.01);
(Continued)

(58) Field of Classification Search
None
See application file for complete search history.

(56) References Cited

U.S. PATENT DOCUMENTS

| 8,462,378 B2 * | 6/2013 | Takeda | C03G 15/36 345/629 |
| 8,516,363 B2 * | 8/2013 | Sakuramata | H04N 1/00411 715/243 |
| 2006/0250630 A1 | 11/2006 | Mori | |

(Continued)

FOREIGN PATENT DOCUMENTS

| CN | 101854496 | 10/2010 |
| JP | 2005-354466 | 12/2005 |
| JP | 2008-078937 | 4/2008 |

OTHER PUBLICATIONS

Office Action for Chinese Patent Application No. 201110308860.8 Dated May 26, 2014, 11 pgs.

(Continued)

*Primary Examiner* — Mohammad Ghayour
*Assistant Examiner* — Pawandeep Dhingra
(74) *Attorney, Agent, or Firm* — Amin, Turocy & Watson LLP; Gregory Turocy

(57) ABSTRACT

An image forming apparatus includes: an image acquiring section configured to acquire an image formation target page image; a display control section configured to perform processing for displaying the page image in a preview display area; an operation-input acquiring section configured to acquire a first operation input for designating a first position in a designatable area and a second operation input for designating a second position in the preview display area; a determining section configured to determine which allocation setting area corresponding to which number of page images is designated as an area where processing for setting a number of page images allocated to one sheet is executed; and a setting section configured to apply setting of a number of page images allocated to one sheet to the page image for which the first operation input is performed.

12 Claims, 12 Drawing Sheets

(51) Int. Cl.
*H04N 1/23* (2006.01)
*G06F 17/24* (2006.01)

(52) U.S. Cl.
CPC ............... *H04N 2201/0039* (2013.01); *H04N 2201/0082* (2013.01); *H04N 2201/0098* (2013.01)

(56) References Cited

U.S. PATENT DOCUMENTS

| | | | | |
|---|---|---|---|---|
| 2007/0139707 | A1* | 6/2007 | Takami | H04N 1/00411 358/1.15 |
| 2008/0040692 | A1* | 2/2008 | Sunday | G06F 3/04883 715/863 |
| 2008/0218816 | A1* | 9/2008 | Sakuramata | H04N 1/00411 358/537 |
| 2009/0079700 | A1* | 3/2009 | Abernathy | G06F 3/04883 345/173 |
| 2009/0278806 | A1* | 11/2009 | Duarte | G06F 3/0416 345/173 |
| 2010/0100855 | A1* | 4/2010 | Yoo | G06F 3/04883 715/863 |
| 2010/0188679 | A1* | 7/2010 | Nakagawa | H04N 1/0035 358/1.12 |
| 2011/0209058 | A1* | 8/2011 | Hinckley | G06F 3/04883 715/702 |

OTHER PUBLICATIONS

Office Action of Notification of Reason(s) for Refusal for Japanese Patent Application No. 2014-050054 Dated Feb. 17, 2015, 2 pages.

* cited by examiner

IMAGE FORMING APPARATUS, IMAGE FORMING PROCESSING SETTING METHOD, AND RECORDING MEDIUM HAVING RECORDED THEREON COMPUTER PROGRAM FOR THE IMAGE FORMING PROCESSING SETTING METHOD

CROSS-REFERENCE TO RELATED APPLICATIONS

This application is based upon and claims the benefit of priority from U.S. provisional application 61/392,707, filed on Oct. 13, 2010; and U.S. provisional application 61/466,654, filed on Mar. 23, 2011; the entire contents all of which are incorporated herein by reference.

FIELD

Embodiments described herein relate generally to a method of setting conditions of image forming processing in an image forming apparatus.

BACKGROUND

In the past, in an image forming apparatus, there is image forming processing called N in 1 print for allocating plural pages to one sheet and performing image formation. For example, in 2 in 1 setting, two pages are allocated to one sheet and image formation is performed. As specific image forming processing by N in 1 setting, for example, when copying is performed in the image forming apparatus, there is processing for performing the N in 1 setting on an operation panel of the image forming apparatus and forming images of original documents for plural pages on one sheet. If a file created in application software executed on a PC connected to the image forming apparatus is printed, for example, in some cases, the N in 1 setting is performed to allocate plural pages to one sheet on a print setting screen displayed by starting printer driver software, a print job is output from the PC to the image forming apparatus, and the image forming apparatus performs image formation on the basis of the print job.

In the setting of the N in 1 print, usually, the number of pages allocated to one sheet is generally set. Therefore, it is necessary to check printed images to find how the pages are actually printed.

DETAILED DESCRIPTION

In general, according to one embodiment, an image forming apparatus includes: an image acquiring section, a display control section, an operation-input acquiring section, a determining section, and a setting section. The image acquiring section acquires an image formation target page image. The display control section performs processing for displaying the page image acquired by the image acquiring section in a preview display area displayed on a setting screen for image forming processing. The operation-input acquiring section acquires a first operation input for designating a first position in a designatable area corresponding to the page image displayed in the preview display area and a second operation input for designating a second position in the preview display area after the first operation input. The determining section determines, on the basis of the second position designated in the second operation input, which allocation setting area corresponding to which number of page images is designated among plural allocation setting areas set for each of the numbers of page images as an area where processing for setting the number of page images allocated to one sheet is executed if the area is designated as the second position. The setting section applies, on the basis of a result of the determination by the determining section, setting of the number of page images allocated to one sheet to the page image for which the first operation input is performed.

Embodiments are explained below with reference to the drawings.

First Embodiment

Figure 1:
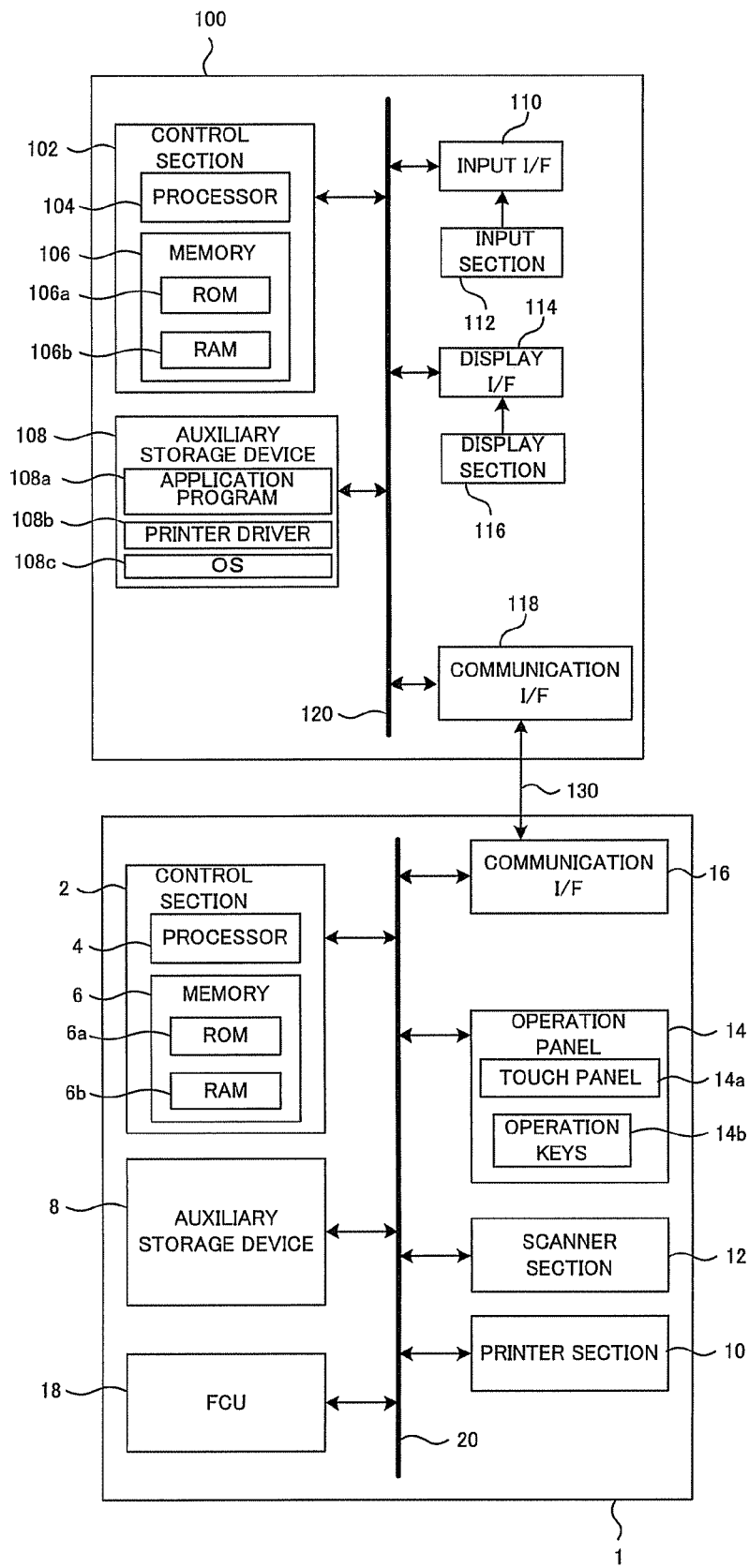
FIG. 1 is a block diagram for explaining the configuration of a system according to an embodiment.

FIG. 1 is a block diagram for explaining the configuration of a system including an image forming apparatus 1 and a client terminal 100.

The image forming apparatus 1 includes a control section 2, an auxiliary storage device 8, a printer section 10, a scanner section 12, an operation panel 14, a communication interface (communication I/F) 16, and a facsimile control unit (FCU) 18. The components of the image forming apparatus 1 are connected via a bus 20.

The control section 2 functions using a processor 4, a memory 6, and an operating system (OS).

The processor 4 is a CPU (Central Processing Unit) or an MPU (Micro Processing Unit).

The memory 6 is, for example, a semiconductor memory. The memory 6 includes a ROM (Read Only Memory) 6a having stored therein a control program of the processor 4 and a RAM (Random Access Memory) 6b configured to provide the processor 4 with a temporary work area.

The control section 2 controls the printer section 10, the scanner section 12, the operation panel 14, the communication I/F 16, the FCU 18, and the like on the basis of the control program or the like stored in the ROM 6a or the auxiliary storage device 8. The control section 2 may further include various image processing functions. The control section 2 may include an ASIC (Application Specific Integrated Circuit) configured to realize a part or all of functions of the image forming apparatus 1.

The auxiliary storage device 8 has stored therein application programs and an OS. The application programs include computer programs for executing the functions of the image forming apparatus 1 such as a copy function, a print function, a scanner function, a facsimile function, and a network file function. The application programs further include an application for a Web client (a Web browser) and other applications.

The auxiliary storage device 8 stores, for example, image data generated by the scanner section 12 reading an original document and data acquired from an external apparatus connected to the communication I/F 16. The auxiliary storage device 8 temporarily stores, until print is executed, a printing job output by the client terminal 100 connected via a network 130.

The auxiliary storage device 8 may be, for example, a magnetic storage device such as a hard disk drive, an optical storage device, a semiconductor storage device (a flash memory, etc.), or an arbitrary combination of these storage devices. The auxiliary storage device 8 appropriately stores software update, a protected electronic document, text data, account information, policy information, and the like.

The printer section 10 forms, on a sheet, an image corresponding to the image data of the original document read by the scanner section 12 and an image corresponding to data sent from an external computer such as the client terminal 100 via the network 130.

The scanner section 12 includes a built-in scanning and reading unit configured to read an original document as an image, a document placing table, and an automatic document feeder configured to feed the original document to a reading position. The scanning and reading unit of the scanner section 12 reads an original document set on the document placing table or the automatic document feeder.

The operation panel 14 includes a touch panel 14a and various operation keys 14b. The touch panel 14a displays setting contents concerning printing conditions such as a sheet size, the number of copies, printing density setting, and finishing (stapling or folding). The operation keys 14b include, for example, a ten key, a reset key, a stop key, and a start key. A user can instruct, for example, execution of various kinds of processing, setting of the printing conditions, and a change of the setting contents of the printing conditions by inputting the instruction from the touch panel 14a or the operation keys 14b.

In this embodiment, setting operation for so-called N in 1 print for allocating plural pages to one sheet and performing print can be performed on the touch panel 14a. Details of setting processing of the N in 1 print are explained in explanation of functional blocks later.

The communication I/F 16 is an interface configured to connect the image forming apparatus 1 and the client terminal 100 via the network 130. In FIG. 1, a configuration in which only the client terminal 100 is connected to the image forming apparatus 1 is shown. However, other external apparatuses can also be connected to the communication I/F 16. Examples of the external apparatuses include an external storage device such as a flash memory. The image forming apparatus 1 can also perform so-called direct print for acquiring image data from the external storage device and printing an acquired image.

The communication I/F 16 makes a connection to an external apparatus through appropriate wireless communication conforming to IEEE802.15, IEEE802.11, IEEE802.3, IEEE1284, or the like such as Bluetooth (registered trademark), infrared ray connection, or optical connection or wired communication by a USB or the like. The communication I/F 16 includes a buffer and temporarily stores a part or all of data received via the network 130 in the butter.

The control section 2 communicates with a PC (Personal Computer) such as the client terminal 100 and other external apparatuses via the communication I/F 16 and the network 130.

The facsimile control unit (FCU) 18 controls transmission processing and reception processing for facsimile in the image forming apparatus 1.

The client terminal 100 includes a control section 102, an auxiliary storage device 108, an input interface (input I/F) 110, an input section 112, a display interface (display I/F) 114, a display section 116, and a communication interface (communication I/F) 118. The components of the client terminal 100 are connected via a bus 120. As the client terminal 100, a PC (Personal Computer), a portable terminal, a tablet terminal, or the like may be used.

The control section 102 functions using a processor 104 including a CPU (Central Processing Unit) or an MPU (Micro Processing Unit), a memory 106, and an operating system (OS) 108c.

The processor 104 executes an application program 108a stored by the auxiliary storage device 108, executes a printer driver 108b, and executes processing for generating a printing job on the basis of printing target data. The processor 104 executes processing for transmitting the generated printing job to the image forming apparatus 1 via the communication I/F 118 and the network 130.

The memory 106 is, for example, a semiconductor memory and includes a ROM (Read Only Memory) 106a having stored therein a control program of the processor 104 and a RAM (Random Access Memory) 106b configured to provide the processor 104 with a temporary work area.

The auxiliary storage device 108 has stored therein the application program 108a, the printer driver 108b, and the OS (Operation System) 108c, which is a control program of the processor 104.

The application program 108a operates as software of the OS 108c. The application program 108a includes a Web application in addition to a general software such as document creation software.

The printer driver 108b is a device driver configured to control the image forming apparatus 1 according to a printing instruction from the application program 108a and operates as software of the OS 108c.

The auxiliary storage device 108 having the functions explained above may be, for example, a hard disk drive or other magnetic storage devices, an optical storage device, a semiconductor storage device such as a flash memory, or an arbitrary combination of these storage devices.

The input I/F 110 is an interface configured to connect the input section 112. The input section 112 is a pointing device such as a keyboard device or a mouse or an input device such as a touch panel.

The display I/F 114 is an interface configured to connect the display section 116. The display I/F 114 receives data to be displayed on the display section 116 from other components connected to the bus 120. The display I/F 114 outputs the display data to the display section 116. The display section 116 displays the output display data. The display section 116 is, for example, a display or a touch panel attached to a PC or the like.

The communication I/F 118 is an interface configured to make a connection to an external apparatus. The communication I/F 118 communicates with external apparatuses (e.g., the image forming apparatus 1 and other PCs and USB devices) via the network 130 through appropriate wireless communication conforming to IEEE802.15, IEEE802.11, IEEE802.3, IEEE1284, or the like such as Bluetooth (registered trademark), infrared ray connection, or optical connection or wired communication by a USB or the like. The control section 102 communicates with the image forming apparatus 1, other PCs and USB devices, and other external apparatuses via the communication I/F 118. In this embodiment, a printing job is transmitted to the image forming apparatus 1 via the communication I/F 118.

Figure 2:
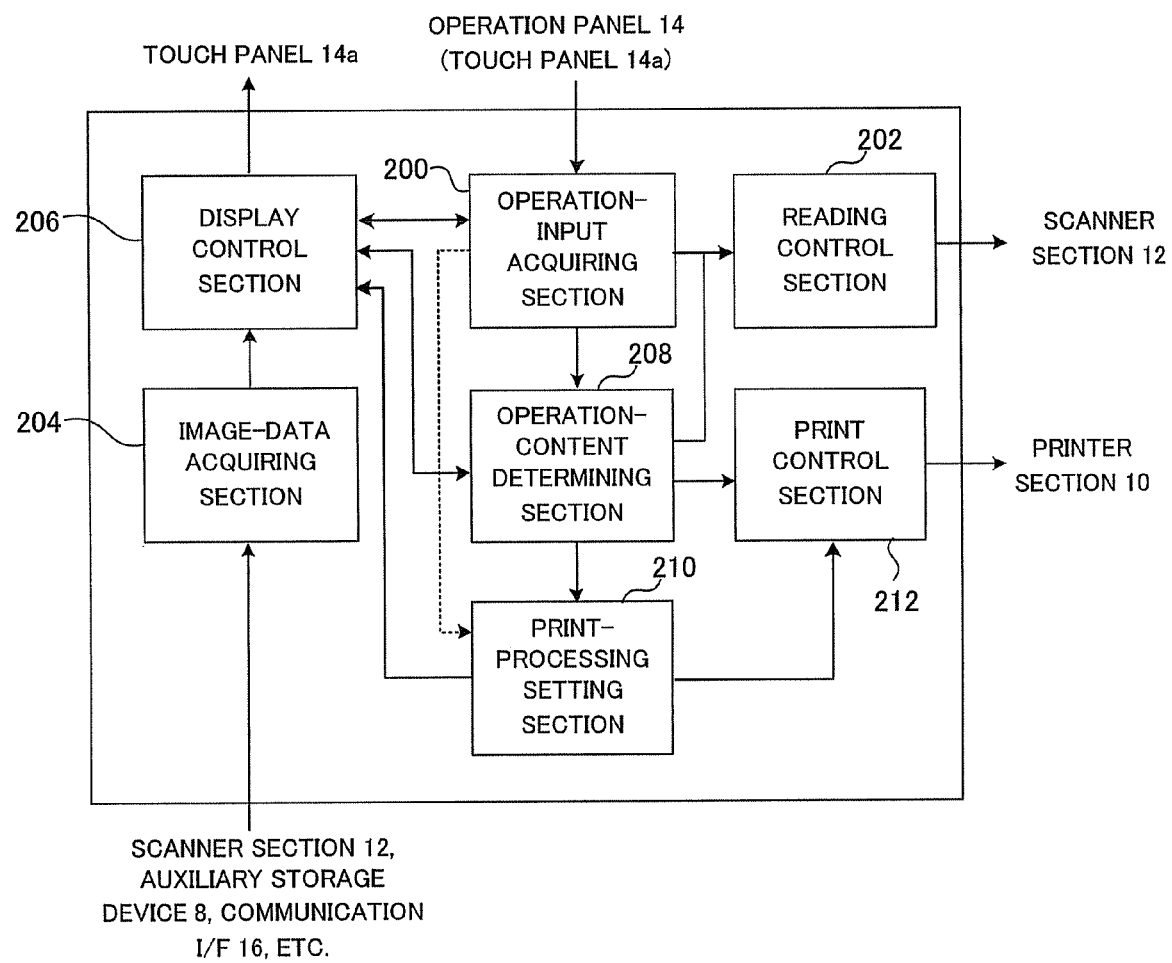
FIG. 2 is a functional block diagram of an image forming apparatus according to the embodiment.

Functions of the image forming apparatus 1 are explained below. FIG. 2 is a functional block diagram of the functions of the image forming apparatus 1 according to this embodiment. FIGS. 3 to 7 are diagrams for explaining operation for setting N in 1 print in the image forming apparatus 1.

The image forming apparatus 1 includes an operation-input acquiring section 200, a reading control section 202, an image-data acquiring section 204, a display control section 206, an operation-content determining section 208, a print-processing setting section 210, and a print control section 212.

The operation-input acquiring section 200 acquires various operation inputs from the operation panel 14 (the touch panel 14a and the operation keys 14b). In this embodiment, the operation-input acquiring section 200 acquires an operation input for setting the N in 1 print performed by operating the touch panel 14a. Besides, the operation-input acquiring section 200 acquires, for example, an execution instruction for processing such as copying, scanning, and facsimile and an operation input for setting conditions for the processing performed on the operation panel 14.

The reading control section 202 controls reading processing for an original document by the scanner section 12. If the operation-input acquiring section 200 acquires an operation input for instructing execution of scan processing or copy processing, the reading control section 202 controls the scanner section 12 to read the original document.

If copying processing or print processing of image data is executed, the image-data acquiring section 204 acquires target image data. In the case of the copy processing, the image-data acquiring section 204 acquires image data generated by the scanner section 12 reading an original document. If the image data is printed, the image-data acquiring section 204 acquires target image data to be printed from the flash memory or the client terminal 100 connected to the communication I/F 16 or other server apparatuses. If an image stored in advance in the auxiliary storage device 8 of the image forming apparatus 1 is printed, image data is acquired from the auxiliary storage device 8.

Figure 3:
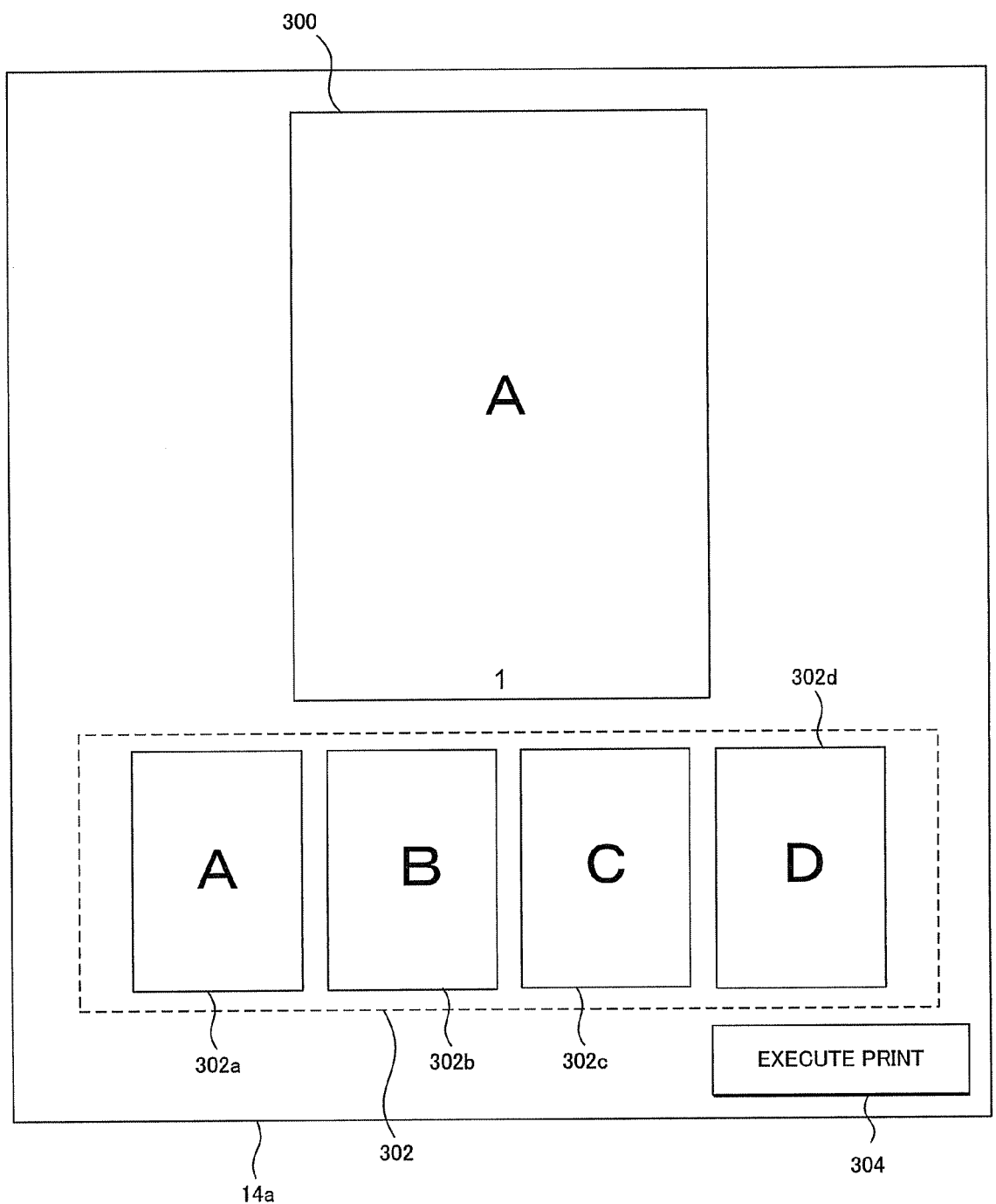
FIG. 3 is a diagram for explaining operation for setting N in 1 print.

The display control section 206 displays the image data acquired by the image-data acquiring section 204 on the touch panel 14a. A display example of the image data acquired by the image-data acquiring section 204 on the touch panel 14a is shown in FIG. 3. In FIG. 3, the image-data acquiring section 204 acquires image data for four pages A to D. As shown in FIG. 3, the image data of the pages A to D are displayed side by side in an acquired image display area 302 on the lower side of a screen of the touch panel 14a by the display control section 206. A preview area 300 is arranged above the acquired image display area 302. The preview area 300 is an area for showing, when the image data is actually printed, how the pages are arranged and printed on a sheet. In FIG. 3, a preview image indicates that the page A is allocated to and printed on a first sheet.

The operation-content determining section 208 determines, if an operation input on the touch panel 14a is performed, what kind of operation the operation input is. In this embodiment, the user performs operation for touching a predetermined range near the preview area 300 on the touch panel 14a, sliding a finger while keeping on touching the predetermined range, and releasing the finger from the touch panel 14a in a predetermined area. Consequently, the user can perform setting of the N in 1 print for setting a state in which original image data for one page is allocated to one sheet (1 in 1 setting) to 2 in 1, 4 in 1, or the like.

Figure 4:
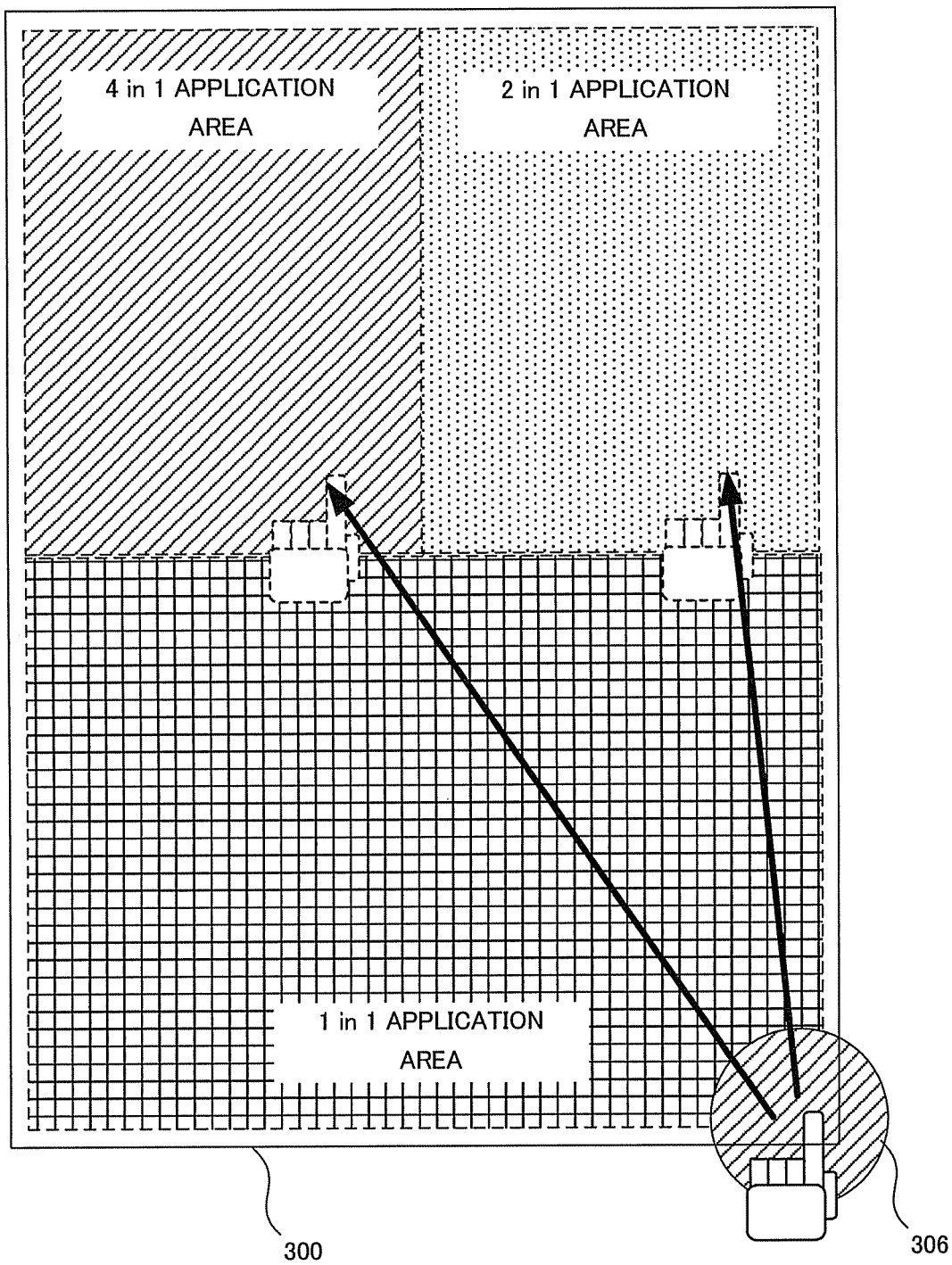
FIG. 4 is a diagram for explaining the operation for setting the N in 1 print.

A method of setting the N in 1 print in this embodiment is specifically explained. FIG. 4 is a diagram for explaining an operation method for changing the 1 in 1 setting to the 2 in 1 or the 4 in 1. First, in a state in which the page A is set as a sheet of a first page in the 1 in 1, the user touches an N in 1 adjustment area 306 in the preview area 300. The "N in 1 adjustment area" is an area where the setting of the N in 1 print can be changed by touch operation for reducing or enlarging an image displayed in the preview area 300. In FIG. 4, as an example, a circular area including a corner at the lower right of a page in the 1 in 1 is shown as the N in 1 adjustment area 306.

If the user performs touch operation for sliding the N in 1 adjustment area 306 to a 2 in 1 application area indicated by dots while keeping on touching the N in 1 adjustment area 306 and performs operation for releasing the finger in the 2 in 1 application area, the operation-content determining section 208 determines that an image of the page A set in the 1 in 1 print is changed to 2 in 1 print setting. If the user slides the N in 1 adjustment area 306 from a state in which the N in 1 adjustment area 306 is touched to a 4 in 1 application area indicated by hatching while maintaining the state and performs operation for releasing the finger in the 4 in 1 application area, the operation-content determining section 208 determines that 1 in 1 print setting is changed to 4 in 1 print setting.

If the operation-content determining section 208 determines that a print execution button 304 displayed in an area at the lower right of the touch panel 14a is touched by the user, the operation-content determining section 208 determines that an operation input for instructing print execution is performed.

If the operation-content determining section 208 specifies contents of touch operation, the print-processing setting section 210 sets setting conditions corresponding to the operation contents as setting conditions in print. For example, as explained above, if the user performs operation for changing the 1 in 1 to 4 in 1 print, the operation-content determining section 208 determines that input touch operation is operation for setting the 4 in 1 print. The print-processing setting section 210 sets, concerning a page to be printed, the N in 1 setting to the 4 in 1 print.

Figure 5:
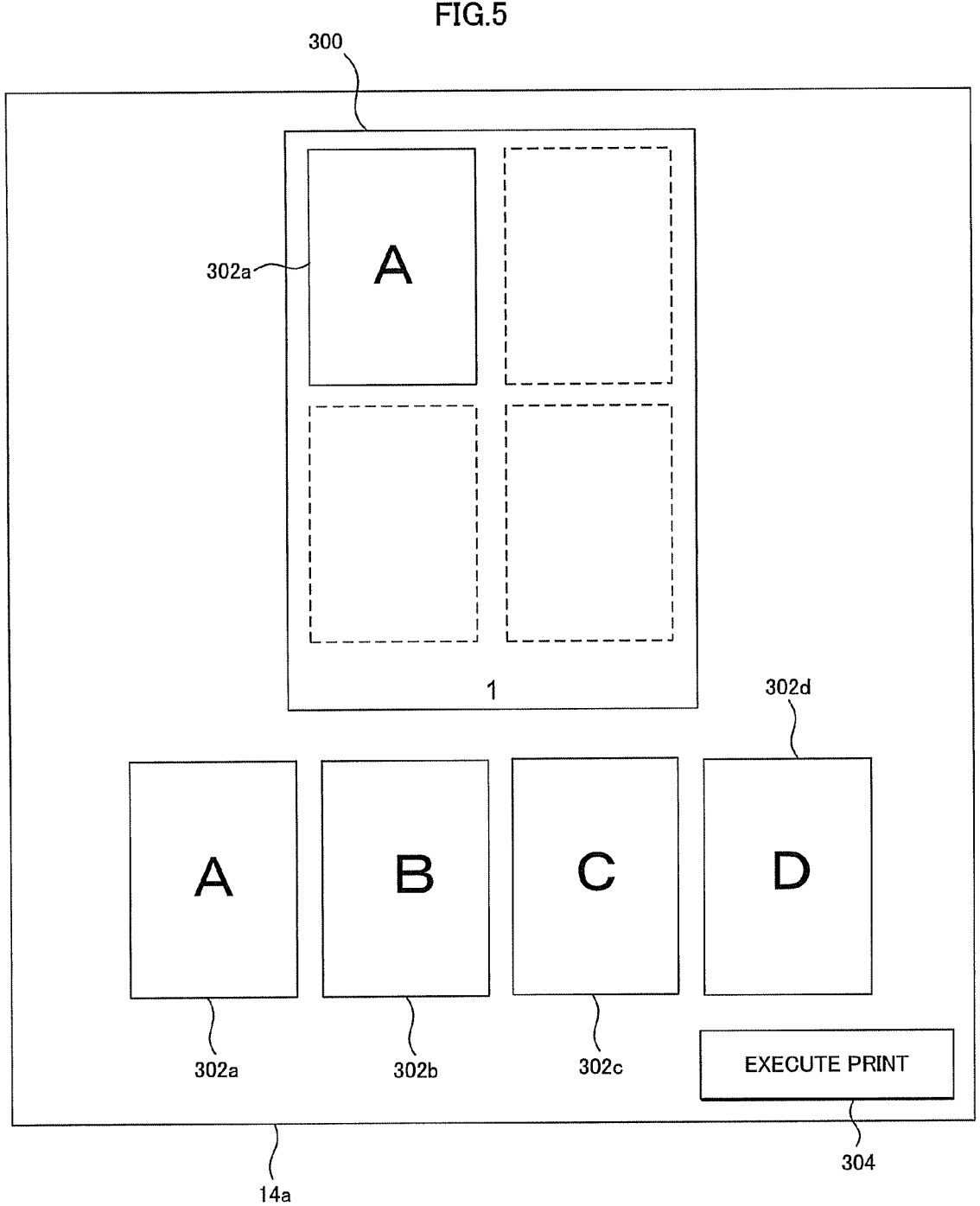
FIG. 5 is a diagram for explaining the operation for setting the N in 1 print.

In FIG. 5, a screen example displayed on the touch panel 14a if the 4 in 1 setting is performed is shown. If the touch operation for setting the 4 in 1 print is performed on the touch panel 14a, the display control section 206 reduces a page A 302a of original data to a quarter area at the upper left of a sheet to be printed and displays the page A 302a. Consequently, the user can intuitively grasp in the preview area 300 that an image of the page A 302a is printed on a first sheet in the 4 in 1.

Figure 6:
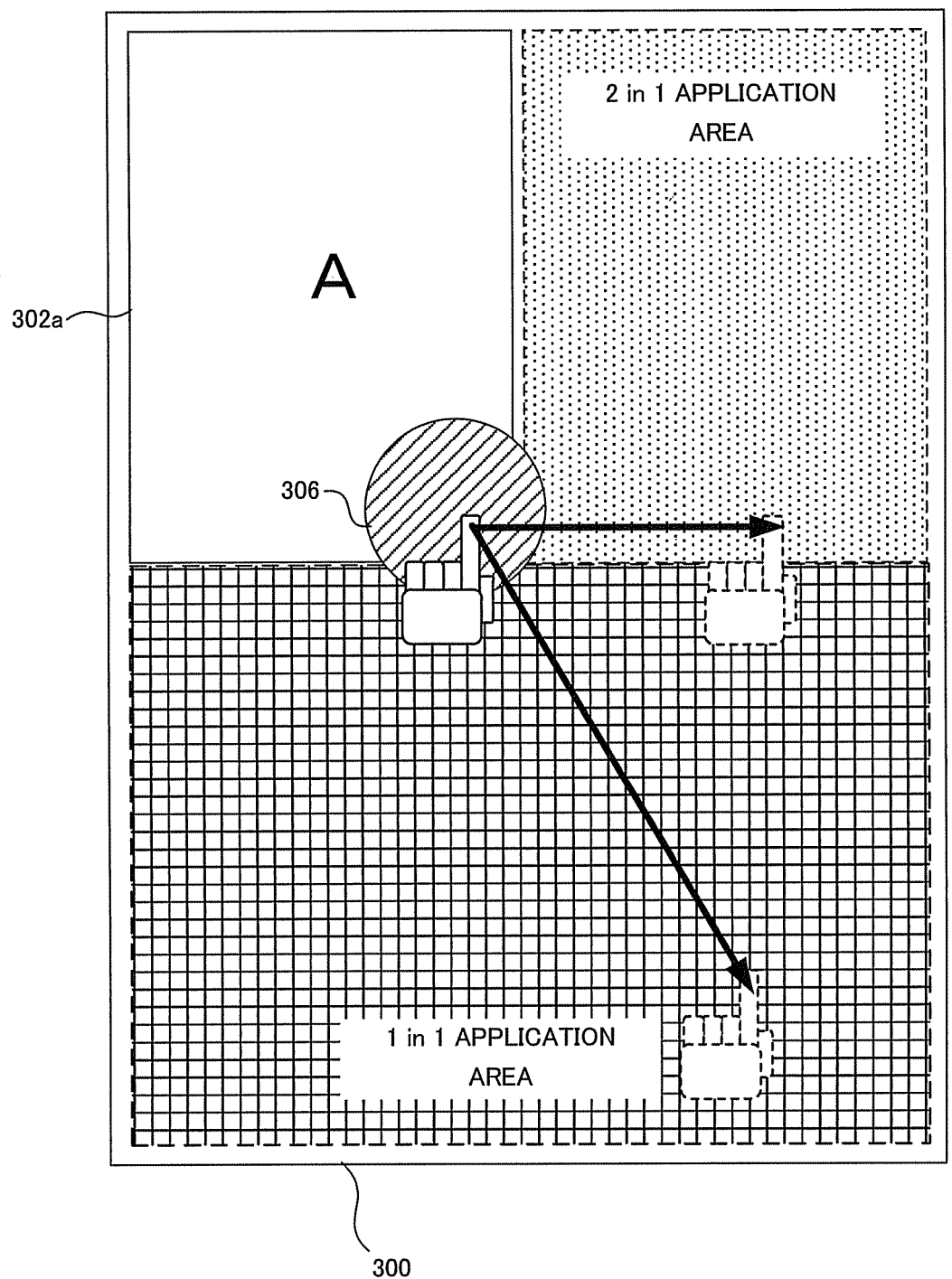
FIG. 6 is a diagram for explaining the operation for setting the N in 1 print.
Figure 7:
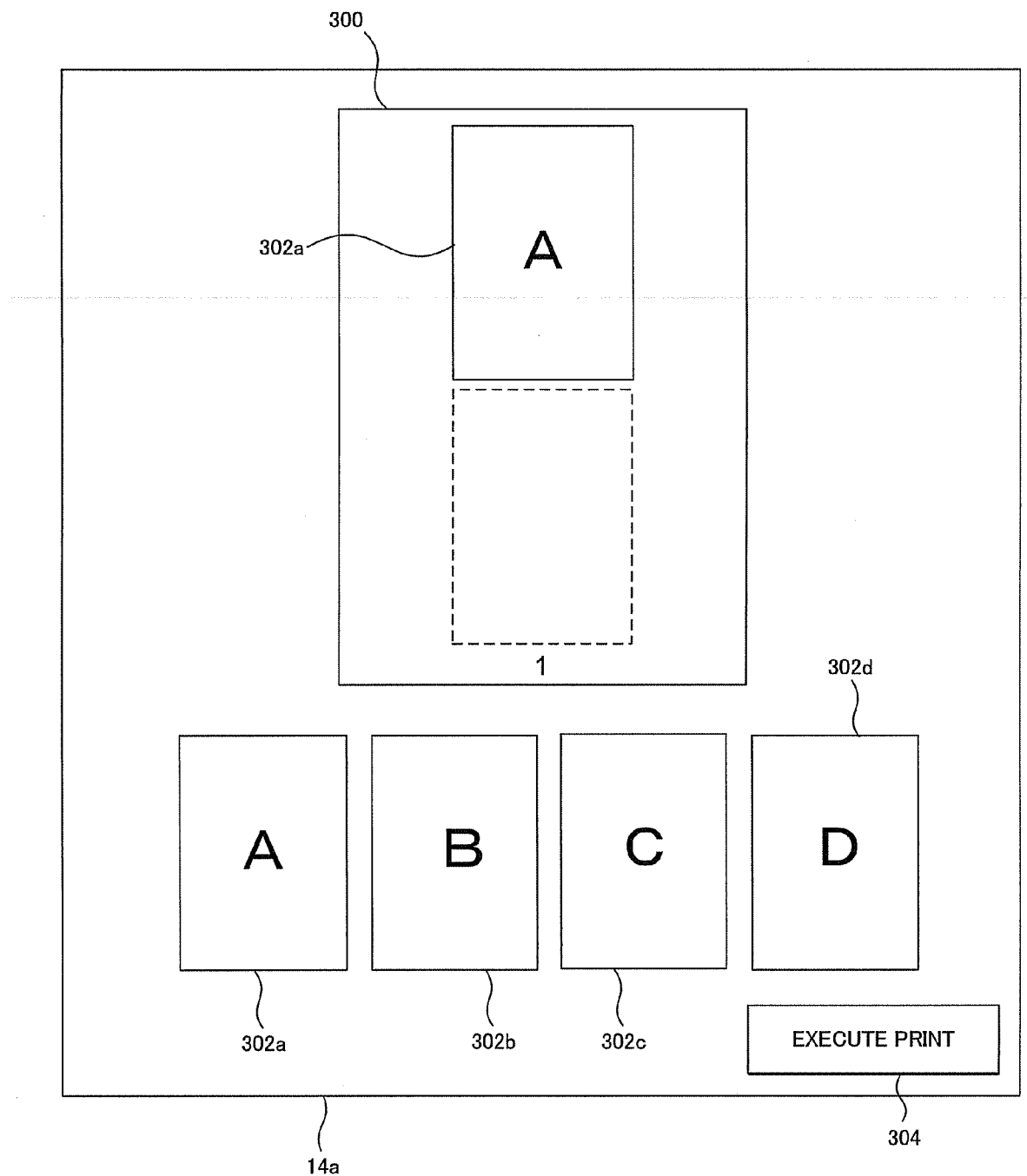
FIG. 7 is a diagram for explaining the operation for setting the N in 1 print.

Further, as another operation example, by a similar operation on the touch panel 14a, a state of the setting of the 4 in 1 print shown in FIG. 5 can be changed to setting of 2 in 1 or 1 in 1 print. FIG. 6 is a diagram for explaining an operation method for changing a state in which the 4 in 1 print is set to another N in 1 setting. As shown in FIG. 6, if the user touches the N in 1 adjustment area 306 at the lower right of the page A 302a displayed in the quarter area of the preview area 300 and slides the N in 1 adjustment area 306 to the 2 in 1 application area while keeping on touching the N in 1 adjustment area 306, the setting of the 4 in 1 print can be changed to the setting of the 2 in 1 print. If the user slides the N in 1 adjustment area 306 to a 1 in 1 application area indicated by a lattice, the setting of the 4 in 1 print can be changed to the setting of the 1 in 1 print. For example, FIG. 7 is a screen example displayed on the touch panel 14a if the setting of the 4 in 1 print is changed to the setting of the 2 in 1 print. As shown in FIG. 7, in this case, in the preview area 300, the image of the page A 302a is displayed in the upper half. The user can intuitively grasp that the image is set to the 2 in 1.

In FIGS. 4 and 6, to facilitate understanding, the areas are indicated by being painted out with the lattice, the dots, and the hatching surrounded by broken lines. However, in a screen actually displayed on the touch panel 14a, the areas do not need to be displayed in this way. If the user slides the N in 1 adjustment area 306 to a predetermined area by touch operation, an image of a page allocated to the area is arranged in a size and a position corresponding to the area and displayed in the preview area 300. Therefore, the user can intuitively grasp that the N in 1 setting is performed.

In FIGS. 4 and 6, the N in 1 adjustment area 306 is indicated by the circular area painted out by the hatching. However, in the screen actually displayed on the touch panel 14a, the N in 1 adjustment area 306 does not need to be visually displayed in this way. If the user knows in advance that the N in 1 setting can be changed by touching a lower right portion of an image and sliding the image, even if it is not shown which area is the N in 1 adjustment area 306, the user can intuitively change the setting of the N in 1 print.

In this embodiment, the N in 1 adjustment area 306 is explained as the area including the corner at the lower right of the image displayed in the preview area 300. However, the N in 1 adjustment area 306 is not always limited to this and may be an area not including the portion at the lower right of the image.

Figure 8:
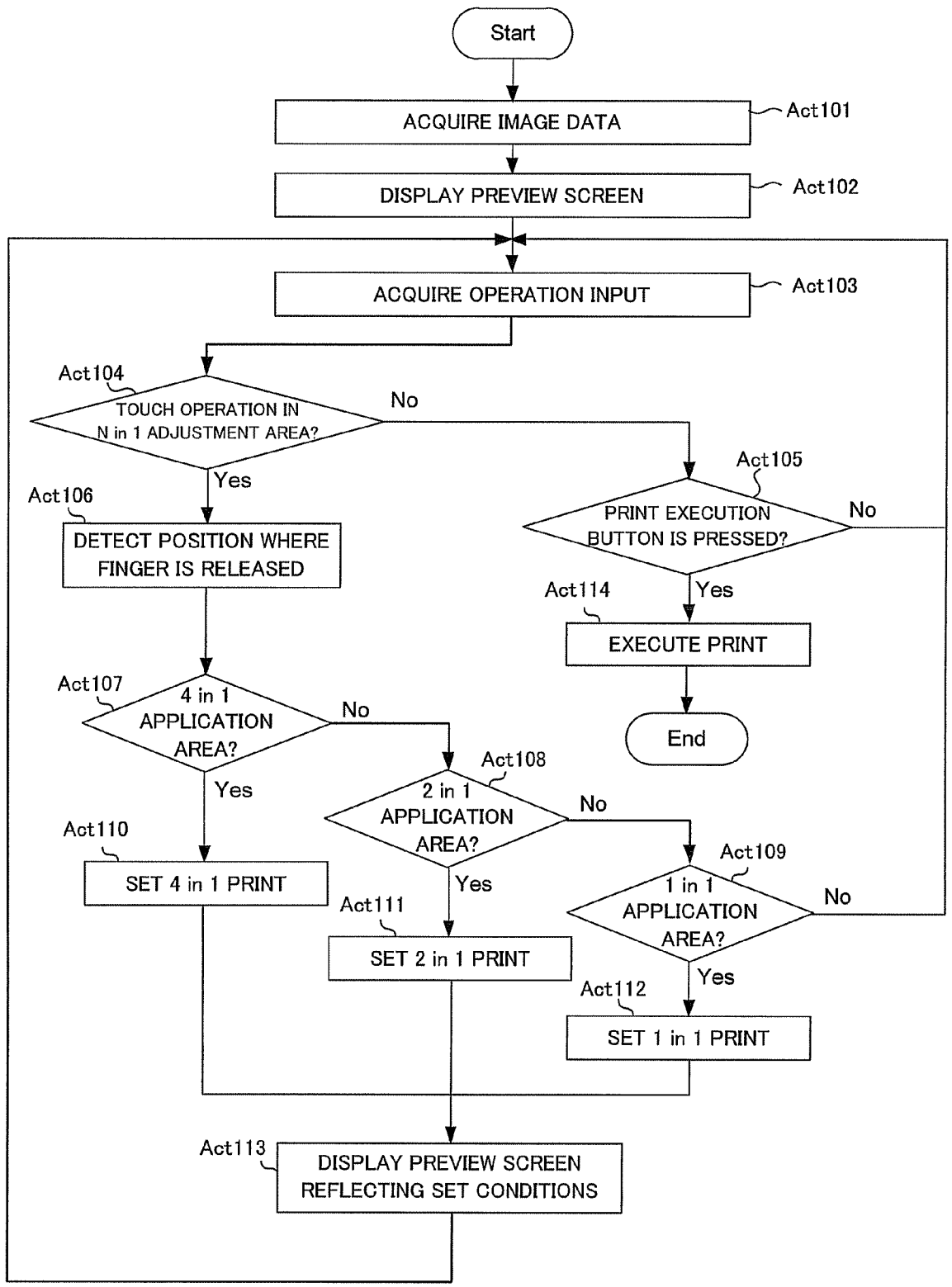
FIG. 8 is a flowchart for explaining a flow of setting processing for the N in 1 print.

A flow of setting processing for the N in 1 print in the image forming apparatus 1 according to this embodiment is explained below. FIG. 8 is a flowchart for explaining a flow of the setting processing for the N in 1 print.

First, the image-data acquiring section 204 acquires image data generated by the scanner section 12 reading an original document prior to copy processing or print target image data stored in the auxiliary storage device 8 or an external apparatus connected to the communication I/F 16 (Act 101).

Subsequently, the display control section 206 displays, on the touch panel 14a, the screen including the list of acquired print target images and the preview image shown in FIG. 3 (Act 102). For example, as in the example explained above, if images of the pages A to D are acquired, images of the page A 302a to a page D 302d are displayed in the acquired-image display area 302 as a list. The page A 302a, which is a first page among the pages, is displayed in the preview area 300 in a state in which the page A 302a is allocated in the 1 in 1 to a first sheet to be printed.

If the user operates the touch panel 14a or the operation keys 14b and performs an operation input, the operation-input acquiring section 200 acquires the operation input (Act 103) The following processing explained below is performed when an operation input is performed on the touch panel 14a. If an operation input is performed using the operation keys 14b, print setting corresponding to the operation is directly performed or processing for executing print is directly started. Therefore, explanation in this case is omitted.

If the user operates the touch panel 14a and the operation-input acquiring section 200 acquires an operation input, first, the operation-content determining section 208 determines to which area a touched position corresponds. Specifically, the operation-content determining section 208 determines whether the touched position is the N in 1 adjustment area 306 of an image corresponding to any one of pages displayed in the preview area 300 (e.g., the page A 302a) (Act 104) or is the print execution button 304 (Act 105).

If the operation-content determining section 208 determines that the touched position is the N in 1 adjustment area 306 (Yes in Act 104), the operation-input acquiring section 200 detects operation for releasing the finger by the user and acquires information concerning a position where the finger is releases (Act 106).

The operation-content determining section 208 determines, on the basis of an operation input for releasing the finger by the user, which area the position where the finger is released is. Specifically, the operation-content determining section 208 determines whether the position is the 4 in 1 application area (Act 107), the 2 in 1 application area (Act 108), or the 1 in 1 application area (Act 109).

If the operation-content determining section 208 determines that the position is the 4 in 1 application area (Yes in Act 107), the print-processing setting section 210 sets the 4 in 1 print as setting of the N in 1 print (Act 110). If the operation-content determining section 208 determines that the position is the 2 in 1 application area (Yes in Act 108), the print-processing setting section 210 sets the 2 in 1 print (Act 111). If the operation-content determining section 208 determines that the position is the 1 in 1 application area (Yes in Act 109), the print-processing setting section 210 sets the 1 in 1 print (Act 112).

The display control section 206 displays, according to the setting of the set N in 1 print, a target image of the N in 1 setting by touch operation in a predetermined area of the preview area 300 (Act 113). For example, if operation for changing the 1 in 1 print to the 4 in 1 print is applied to the page A 302a, the page A is displayed in a quarter area of the preview area 300. While the user is sliding the finger in order to perform the setting of the N in 1 print, the display control section 206 may perform, in parallel to the movement of the finger, animation display or the like for reducing or enlarging the target image of the setting.

If the operation-content determining section 208 determines that the position where the user releases the finger is none of the N in 1 application areas (No in Act 109), the print-processing setting section 210 maintains N in 1 setting at that point (i.e., if the N in 1 setting is the 1 in 1 setting, maintains the 1 in 1 setting). The processing returns to Act 103.

If the operation-content determining section 208 determines that the touch operation is not touch operation in the N in 1 adjustment area 306 (No in Act 104) but touch operation of the print execution button 304 (Yes in Act 105), the print control section 212 causes the printer section 10 to execute print processing on the basis of setting contents of print processing set by the print-processing setting section 210 at that point (Act 114) and the processing ends.

On the other hand, if the setting-content determining section 208 determines that the position touched by the user is neither the N in 1 adjustment area 306 (No in Act 104) nor the print execution button 304 (No in Act 105), the processing returns to Act 103.

The flow of the image forming processing including the print setting processing by the image forming apparatus 1 according to this embodiment is as explained above.

With the image forming apparatus 1 according to this embodiment, it is possible to easily set and change the N in 1 print with intuitive operation.

In this embodiment, it is explained that operation is performed on the touch panel 14a of the image forming apparatus 1. However, the N in 1 print is not limited to this. For example, if the image forming apparatus 1 includes a pointing device such as a mouse together with the touch panel 14a or instead of the touch panel 14a, the setting processing for the N in 1 print can be performed by a method same as the method explained above according to operation (e.g., drag and drop) of the pointing device.

In this embodiment, it is explained that the N in 1 setting is performed in the image forming apparatus 1. However, the N in 1 print is not limited to this. For example, when a computer such as the client terminal 100 instructs the image forming apparatus to perform print, the computer can display the screen for the N in 1 print setting explained in this embodiment and perform the setting for the N in 1 print explained in this embodiment. In this case, if the computer includes a touch panel, the N in 1 setting can be directly applied to operation on the touch panel. If the computer includes a pointing device such as a mouse, the setting processing for the N in 1 print explained in this embodiment can be performed by operation by the pointing device. The N in 1 print setting in the computer only has to be performed on a screen of a printer driver started when print is instructed.

Second Embodiment

A second embodiment is explained below. The image forming apparatus 1 according to this embodiment further includes a function of enabling a user to individually change, for each of images, the directions of images allocated to one sheet in N in 1 print by performing operation for touching, on the touch panel 14a, a predetermined area in a state in which an image of a page allocated to the preview area 300 is displayed and sliding the image to be rotated.

Figure 9:
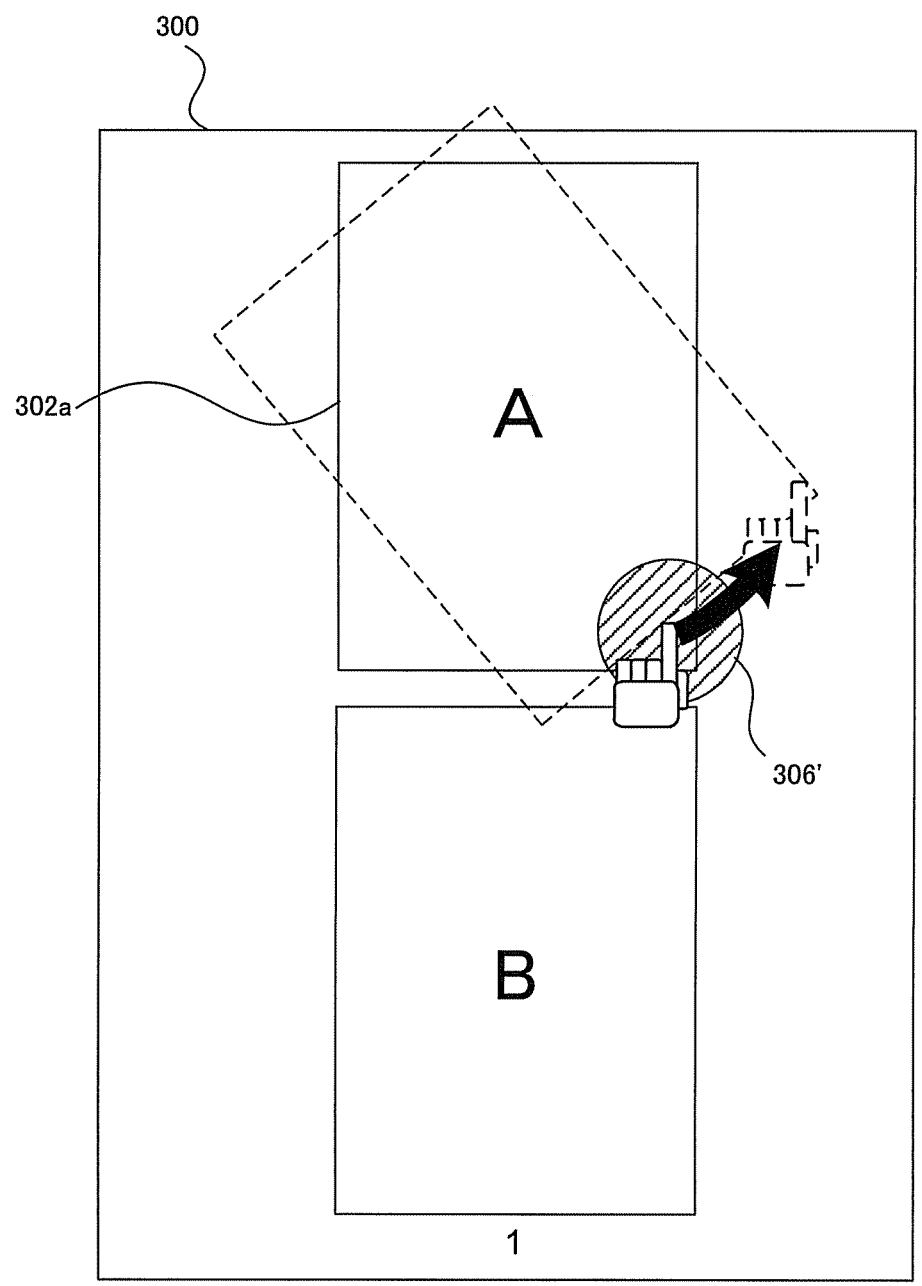
FIG. 9 is a diagram for explaining an operation method for changing the direction of an image.

FIG. 9 is a diagram for explaining an operation method for changing the direction of an image in this embodiment. A page A and a page B are allocated to and displayed in the preview area 300 of the screen of the touch panel 14a explained in the first embodiment. In other words, 2 in 1 print is set.

In the image forming apparatus 1 according to this embodiment, on this screen, for example, if the user touches an N in 1 adjustment area 306' of the page A 302a, slides a finger to operate an image to be rotated, and releases the finger from the touch panel 14a, processing for rotating the image a predetermined angle in accordance with a position where the user releases the finger is executed.

Specifically, the operation-input acquiring section 200 acquires an operation input of the user for touching the N in 1 adjustment area 306', which functions as an area where rotating operation is possible in the preview area 300, and rotating the image with the center of the page A generally set as the center of rotation while keeping on touching the area, and releasing the finger. If the operation-content determining section 208 determines that the touched position is the N in 1 adjustment area 306', the operation-content determining section 208 determines which degree the image is rotated in a position where the finger is released thereafter.

Figure 10:
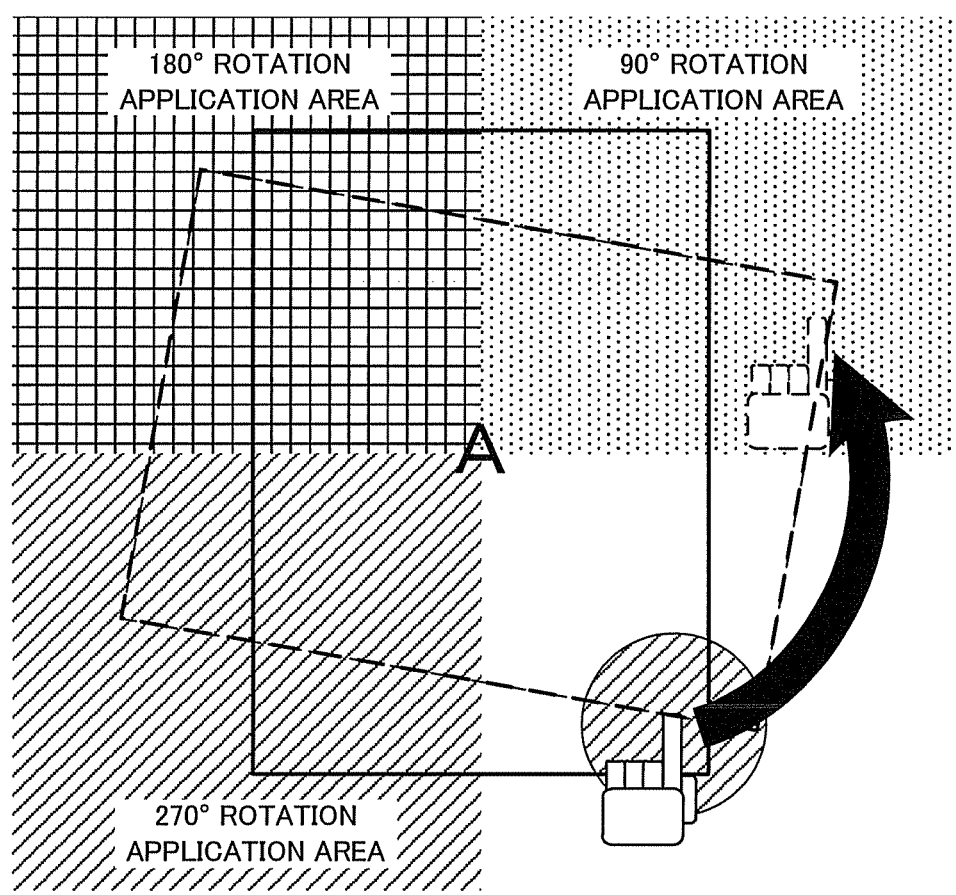
FIG. 10 is a diagram for explaining the operation method for changing the direction of an image.

In FIG. 10, it is indicated which degree the image is rotated according to in which position the user releases the finger after performing the rotating operation on the touch panel 14a. As shown in FIG. 10, if the finger is released in a 90° rotation application area, the operation-content determining section 208 determines that operation for rotating the image 90° is performed. Similarly, if the finger is released in a 180° rotation application area, the operation-content determining section 208 determines that operation for rotating the image 180° is performed. If the finger is released in a 270° rotation application area, the operation-content determining section 208 determines that operation for rotating the image 270° is performed.

The rotation application areas at the respective angles shown in FIG. 10 are shown as an example for enabling intuitive operation and are not limited to such areas divided into four. The rotation application areas at the respective angles may be, for example, areas in a narrower angle range.

Figure 11:
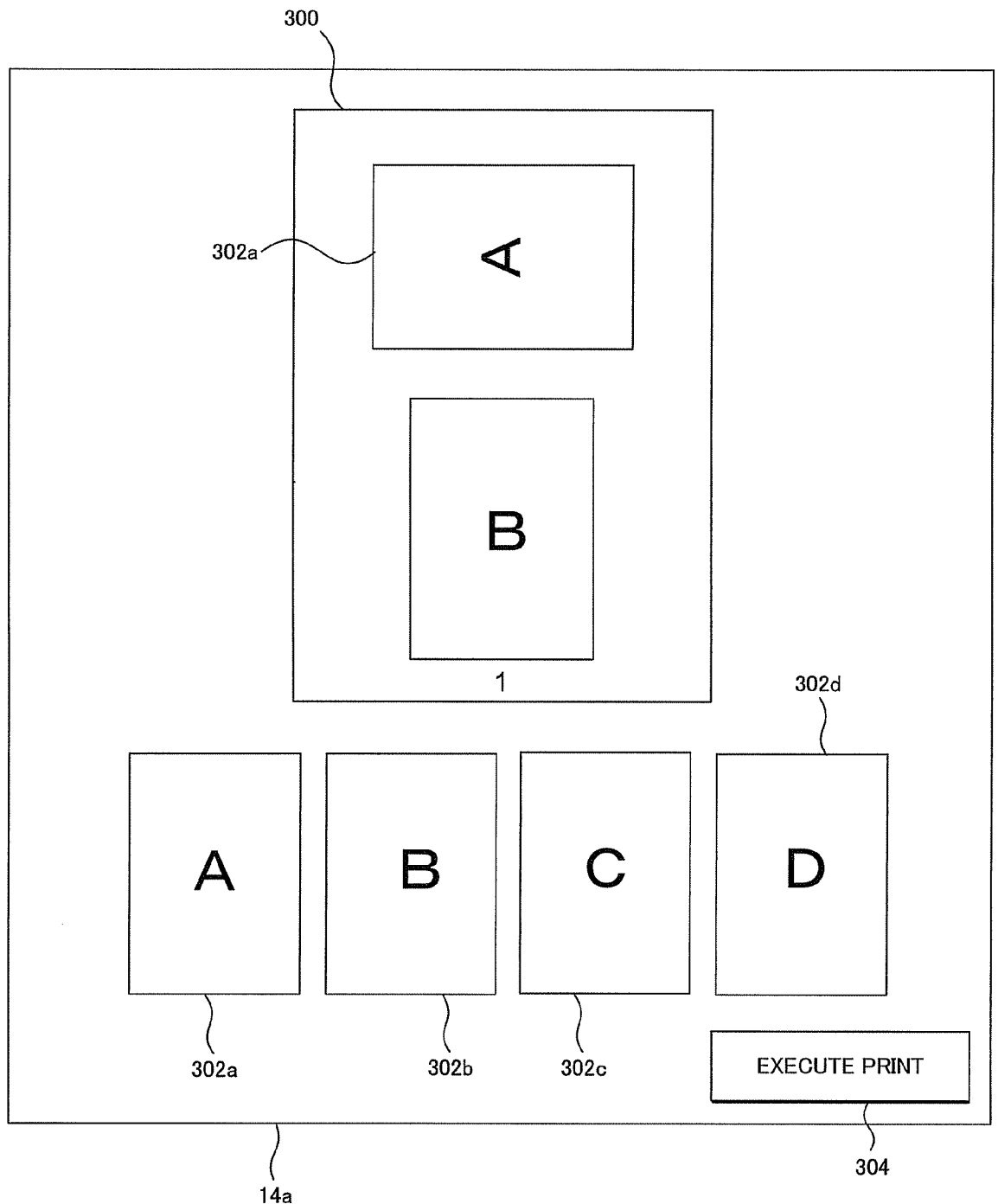
FIG. 11 is a diagram for explaining the operation method for changing the direction of an image.

The print-processing setting section 210 executes, on the basis of a result of the determination by the operation-content determining section 208 which degree the image is rotated, on the rotated image of the page, processing for changing an angle in a sheet to which the image is allocated. The display control section 206 displays the image in the preview area 300 in a state in which the angle is changed. In FIG. 11, a screen of the touch panel 14a displayed in the preview area 300 by rotating the image of the page A 302a 90° is shown.

As explained above, with the functions of the image forming apparatus according to this embodiment, it is possible to individually change directions of images of pages allocated to one sheet intuitively and with simple operation.

Figure 12:
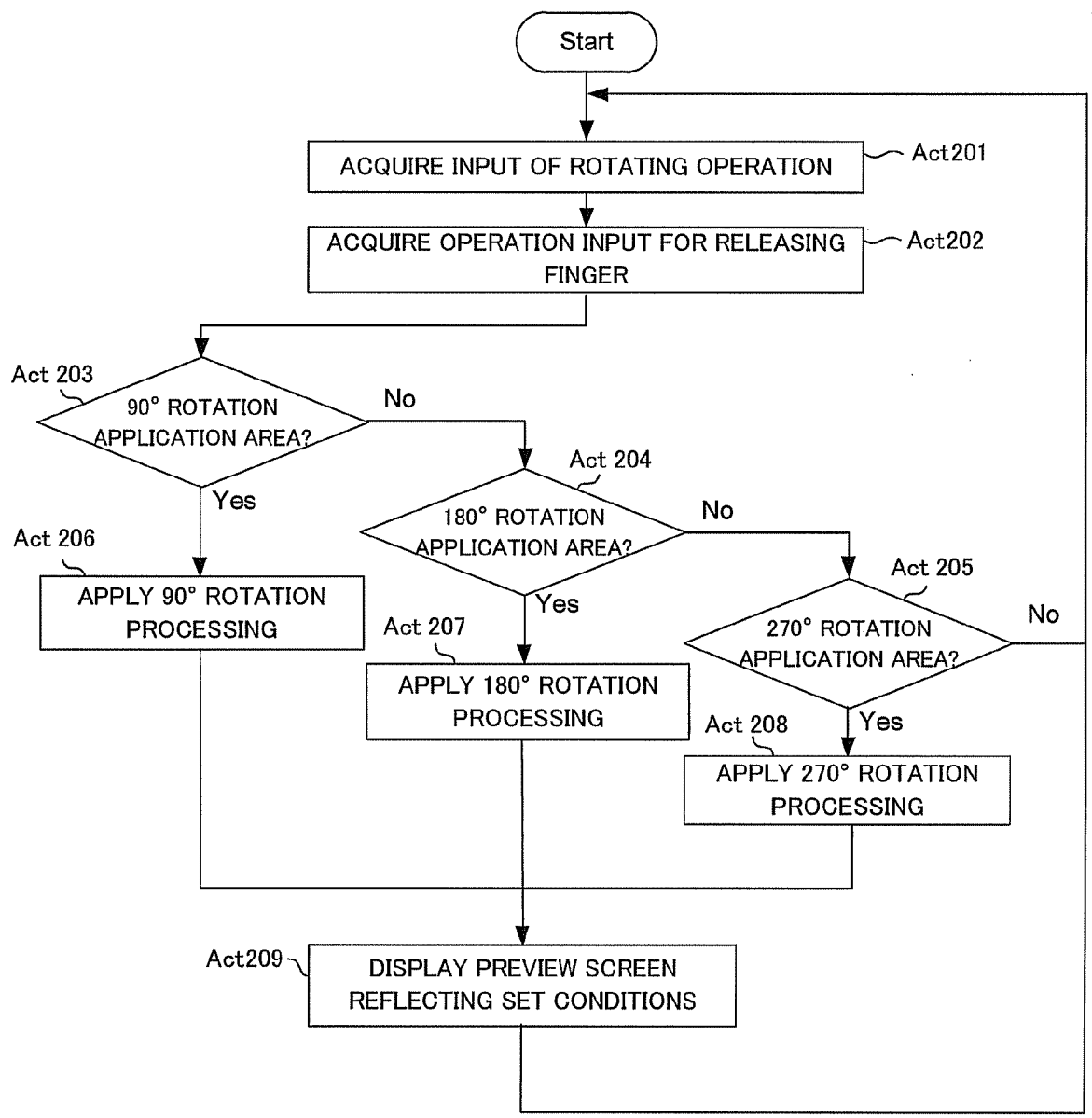
FIG. 12 is a flowchart for explaining a flow of rotation processing for changing the direction of an image.

A flow of rotation processing for an image in the image forming apparatus 1 according to this embodiment is explained below. FIG. 12 is a flowchart for explaining the flow of the rotation processing for an image in the image forming apparatus 1. The flow of the rotation processing for an image explained with reference to the flowchart of FIG. 12 is a flow of processing from a state in which an original document is, for example, scanned, images of pages are acquired by the image-data acquiring section 204, and, in the preview area 300 of the touch panel 14a, 2 in 1 print setting is applied to the page A 302a and the page B 302b and the page A 302a and the page B 302b are displayed by the display control section 206 in a state in which the page A 302a and the page B 302b are allocated to one sheet.

First, the operation-input acquiring section 200 acquires a touch operation input for touching the N in 1 adjustment area 306' of an image of any one of pages in the preview image 300 and rotating the image (Act 201).

Subsequently, the operation-input acquiring section 200 acquires an operation input for releasing the finger after the rotating operation (Act 202). The operation-content determining section 208 determines in which area the finger is released in the operation input acquired by the operation-input acquiring section 200. Specifically, the operation-content determining section 208 determines whether the finger is released in the 90° rotation application area (Act 203), whether the finger is released in the 180° rotation application area (Act 204), and whether the finger is released in the 270° rotation application area (Act 205).

If the operation-content determining section 208 determines that the finger is released in the 90° rotation application area (Yes in Act 203), the print-processing setting section 210 applies processing for rotating the image 90° (Act 206). If the operation-content determining section 208 determines that the finger is released in the 180° rotation application area (Yes in Act 204), the print-processing setting section 210 applies processing for rotating the image 180° (Act 207). If the operation-content determining section 208 determines that the finger is released in the 270° rotation application area (Yes in Act 205), the print-processing setting section 210 applies processing for rotating the image 270° (Act 208).

The display control section 206 rotates, in accordance with the applied rotation angle, the rotated image a set angle and displays the image in the preview area 300 (Act 209).

If the operation-content determining section 208 determines that the position where the user releases the finger is none of the rotation application areas (No in Act 205), the display control section 206 does not perform the processing for rotating the operation target image. The processing returns to Act 201.

The flow of the rotation processing in the image forming apparatus 1 according to this embodiment is as explained above. If the touch operation of the print execution button 304 or the touch operation for the N in 1 print setting explained in the first embodiment is performed, processing corresponding to the touch operation only has to be executed in accordance with the flow of the processing shown in the flowchart of FIG. 8.

For example, if the operation for touching the N in 1 adjustment area 306' of the operation target image and rotating the image is performed and, at the same time, the operation for sliding the image to any one of the N in 1 application areas explained in the first embodiment is performed, processing by both the kinds of operation may be applied in accordance with the position where the finger is released. For example, if, from a state in which the 4 in 1 print is set and an image is displayed in a quarter area of the preview area 300, the N in 1 adjustment area 306' is touched to rotate the image 90° and slid the image to the 2 in 1 application area and the finger is released, the image only has to be displayed in a half area of the preview area in a state in which the image is rotated 90°. Consequently, the user can intuitively grasp that the target image is changed from the 4 in 1 to the 2 in 1 and the processing for changing the direction of the image is applied.

The operation for rotating the image is not limited to only one image. For example, all images displayed in the N in 1 may be rotated by performing the operation once.

The processing explained in this embodiment can also be performed by a pointing device other than the touch panel 14a in the image forming apparatus 1. When an external computer other than the image forming apparatus 1 instructs the image forming apparatus 1 to perform print, the processing can be performed using a pointing device such as a mouse on a display of the computer.

In this embodiment, it is explained that the image can be rotated to the three rotation angles: 90°, 180°, and 270°. However, the rotation angles are not limited to these angles. A larger number of rotation application areas may be provided to enable finer setting of rotation angles.

As explained above, according to the present invention, it is possible to set and change the number of pages allocated to one sheet easily and with intuitive operation.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus comprising: an image acquiring section configured to acquire an image formation target page image; a display control section configured to perform processing for displaying the page image acquired by the image acquiring section in a preview display area displayed on a setting screen for image forming processing; an operation-input acquiring section configured to acquire a first operation input for designating a first position in a designatable area which is an area including a right-bottom edge of a most smaller number of the page image displayed in the preview display area and a second operation input for designating a second position in the preview display area after the first operation input; a determining section configured to determine in which region of the preview display area the second position is located; and a setting section configured to set a layout by putting a single page image or multiple page images on a single sheet on a basis of the determined region of the preview display area and apply the page image for which the first operation input is performed, when the second position is located upward or in a left direction from the first position, apply so as to have the layout put more page images, when the second position is located downward or in right direction from the first position, apply so as to have the layout put lesser pages images, wherein: when the layout to put one page image on one sheet is displayed in the preview display area and when the second position is located upper from the first position and is located in the right-upper area of the preview display area, apply so as to have the layout put the two-page images on one sheet, when the layout to put one page image on one sheet is displayed in the preview display area and, when the second position is located left-upper from the first position and is located in the left-upper area of the preview display area, apply so as to have the layout put the four page images on one sheet, when the layout to put four page images on one sheet is displayed in the preview display area and when the second position is located right from the first position and is located in the right-upper area of the preview display area, apply so as to have the layout put the two page images on one sheet, and when the layout to put four page images on one sheet is displayed in the preview display area, and when the second position is located lower direction from the first position and is located in the lower area of the preview display area, apply so as to have the layout put the one page image on one sheet.

2. The apparatus according to claim 1, wherein the first operation input and the second operation input are an operation input for, after performing operation for moving the page image from the first position to the second position while maintaining designating operation performed in the first position, releasing the designation in the second position to thereby designate the second position.

3. The apparatus according to claim 1, wherein the allocation setting area is an area including at least a part of an area where, if processing for setting a number of pages allocated to one sheet is executed, the page image is displayed in accordance with the set number of page images in the preview display area.

4. The apparatus according to claim 1, further comprising a touch panel on which display control is performed by the display control section and an operation input acquired by the operation-input acquiring section is performed.

5. An image forming processing setting method comprising: acquiring an image formation target page image; performing processing for displaying the acquired page image in a preview display area displayed on a setting screen for image forming processing; acquiring a first operation input for designating a first position in a designatable area which is an area including a right-bottom edge of a most smaller number of the page image displayed in the preview display area and a second operation input for designating a second position in the preview display area after the first operation input; determining in which region of the preview display area the second position is located; and setting a layout by putting a single page image or multiple page images on a single sheet on a basis of the determined region of the preview display area and applying the page image for which the first operation input is performed, when the second position is located upward or in a left direction from the first position, apply so as to have the layout put more page images, when the second position is located downward or in right direction from the first position, apply so as to have the layout put lesser pages images, wherein: when the layout to put one page image on one sheet is displayed in the preview display area and when the second position is located upper from the first position and is located in the right-upper area of the preview display area, apply so as to have the layout put the two page images on one sheet, when the layout to put one page image on one sheet is displayed in the preview display area and when the second position is located left-upper from the first position and is located in the left-upper area of the preview display area, apply so as to have the layout put the four page images on one street, when the layout to put four page images on one sheet is displayed in the preview display area and when the second position is located right from the first position and is located in the right-upper area of the preview display area, apply so as to have the layout out the two page images on one sheet, and when the layout to put four page images on one sheet is displayed in the preview display area, and when the second position is located lower direction from the first position and is located in the lower area of the preview display area, apply so as to have the layout put the one page image on one sheet.

6. The method according to claim 5, wherein the first operation input and the second operation input are an operation input for, after performing operation for moving the page image from the first position to the second position while maintaining designating operation performed in the first position, releasing the designation in the second position to thereby designate the second position.

7. The method according to claim 5, wherein the allocation setting area is an area including at least a part of an area where, if processing for setting a number of pages allocated to one sheet is executed, the page image is displayed in accordance with the set number of page images in the preview display area.

8. The method according to claim 5, wherein the processing for displaying the page image in the preview display area and the first operation input and the second operation input are performed on a touch panel.

9. A non-transitory computer-readable recording medium having recorded thereon a computer program for causing a computer to execute processing for: acquiring an image formation target page image; performing processing for displaying the acquired page image in a preview display area displayed on a setting screen for image forming processing; acquiring a first operation input for designating a first position in a designatable area which is an area including a right-bottom edge of a most smaller number of the page image displayed in the preview display area and a second operation input for designating a second position in the preview display area after the first operation input; determining in which region of the preview display area the second position is located; and setting a layout by putting a single page image or multiple page images on a single sheet on a basis of the determined region of the preview display area and applying the page image for which the first operation input is performed, when the second position is located upward or in a left direction from the first position, apply so as to have the layout put more page images, when the second position is located downward or in right direction from the first position, apply so as to have the layout put lesser pages images, wherein: when the layout to out one page image on one sheet is displayed in the preview display area and when the second position is located upper from the first position and is located in the right-upper area of the preview display area, apply so as to have the layout put the two pace images on one sheet, when the layout to out one page image on one sheet is displayed in the preview display area and when the second position is located left-upper from the first position and is located in the left-upper area of the preview display area, apply so as to have the layout out the four page images on one sheet, when the layout to put four page images on one sheet is displayed in the preview display area and when the second position is located right from the first position and is located in the right-upper area of the preview display area, apply so as to have the layout put the two page images on one sheet, and when the layout to put four page images on one sheet is displayed in the preview display area, and when the second position is located lower direction from the first position and is located in the lower area of the preview display area, apply so as to have the layout put the one page image on one sheet.

10. The non-transitory recording medium according to claim 9, wherein the first operation input and the second operation input are an operation input for, after performing operation for moving the page image from the first position to the second position while maintaining designating operation performed in the first position, releasing the designation in the second position to thereby designate the second position.

11. The non-transitory recording medium according to claim 9, wherein the allocation setting area is an area including at least a part of an area where, if processing for setting a number of pages allocated to one sheet is executed, the page image is displayed in accordance with the set number of page images in the preview display area.

12. The non-transitory recording medium according to claim 9, wherein the processing for displaying the page image in the preview display area and the first operation input and the second operation input are processing performed on a touch panel.

* * * * *